(12) United States Patent
Phillips et al.

(10) Patent No.: US 8,785,073 B2
(45) Date of Patent: Jul. 22, 2014

(54) INLET MANIFOLD WITH GUIDING STRUCTURE FOR FUEL CELL

(75) Inventors: Richard R. Phillips, West Hartford, CT (US); Michael D. Harrington, Enfield, CT (US)

(73) Assignee: Ballard Power Systems Inc., Burnaby (CA)

( * ) Notice: Subject to any disclaimer, the term of this patent is extended or adjusted under 35 U.S.C. 154(b) by 328 days.

(21) Appl. No.: 13/120,261

(22) PCT Filed: Nov. 11, 2008

(86) PCT No.: PCT/US2008/083073
§ 371 (c)(1),
(2), (4) Date: Mar. 22, 2011

(87) PCT Pub. No.: WO2010/056231
PCT Pub. Date: May 20, 2010

(65) Prior Publication Data
US 2011/0171557 A1    Jul. 14, 2011

(51) Int. Cl.
*H01M 8/04*        (2006.01)
*H01M 8/24*        (2006.01)

(52) U.S. Cl.
USPC .......................................... 429/458; 429/513

(58) Field of Classification Search
None
See application file for complete search history.

(56) References Cited

U.S. PATENT DOCUMENTS

| 4,670,361 | A | 6/1987 | Tsutsumi et al. |
| 5,041,344 | A | 8/1991 | Kamoshita |
| 5,484,666 | A | 1/1996 | Gibb |
| 6,495,280 | B2 | 12/2002 | Morrow |
| 6,541,148 | B1 | 4/2003 | Walsh |
| 6,632,556 | B2 | 10/2003 | Guthrie |
| 6,875,535 | B2 | 4/2005 | Ye |
| 6,924,056 | B2 | 8/2005 | Whiton |
| 6,945,266 | B2 | 9/2005 | de Tezanos Pinto |
| 7,094,491 | B2 | 8/2006 | Yoshimoto |
| 7,291,416 | B2 | 11/2007 | Margiott |
| 7,875,397 | B2 * | 1/2011 | Geschwindt et al. ......... 429/415 |
| 2005/0129999 | A1 | 6/2005 | Geschwindt et al. |
| 2010/0248066 | A1 * | 9/2010 | Frederiksen et al. ......... 429/458 |

FOREIGN PATENT DOCUMENTS

JP        16185935 A    7/2004

OTHER PUBLICATIONS

Search Report and Written Opinion mailed on Jun. 30, 2009 for PCT/US2008/083073.

* cited by examiner

*Primary Examiner* — John S Maples
(74) *Attorney, Agent, or Firm* — Seed IP Law Group PLLC

(57) ABSTRACT

A fuel cell includes an inlet manifold that communicates with an inlet pipe. The inlet pipe enters the inlet manifold at a port. A baffle is positioned about the port. The baffle captures and directs fuel away from a side of the inlet manifold that will face a cell stack. A fuel cell incorporating such an inlet manifold is also claimed.

17 Claims, 2 Drawing Sheets

INLET MANIFOLD WITH GUIDING STRUCTURE FOR FUEL CELL

BACKGROUND OF THE INVENTION

This application relates, primarily, to guiding structure for an inlet manifold in a fuel cell.

Fuel cells are becoming widely utilized to provide generation of power. In a standard fuel cell, an inlet manifold directs a fuel, such as hydrogen, from a pipe into a generally planar manifold. A common configuration has the manifold positioned on one side of a cell stack, and an outlet manifold is positioned on an opposed side of a cell stack. Another configuration has the inlet and outlet manifold on the same side each covering a proportion of that side while the opposite side is a fuel turn manifold which covers the full side.

The fuel enters through the inlet pipe at a relatively high velocity, and then expands into the enlarged area of the inlet manifold. The high velocity fuel stream presents a challenge to evening spread the fuel across the face of the cell stack in the manifold. An even distribution of fuel is important to increase fuel cell operational life and to provide rapid start up. An uneven distribution, or maldistribution, of fuel will locally starve portions of the fuel cell. This starvation will create permanent areas of damage to the anode and cathode cells.

Previous attempts that have been utilized is the provision of a plurality of guiding passages such that the fuel is split into a number of separate channels, and then distributed across the face of the cell stack.

These approaches have been unduly complex, and have not always adequately addressed the problem.

SUMMARY OF THE INVENTION

An example fuel cell includes an inlet manifold that communicates with an inlet pipe. The inlet pipe enters the inlet manifold at a port. A baffle is positioned about the port. The baffle captures and directs fuel away from a side of the inlet manifold that will face a cell stack. A fuel cell incorporating such an inlet manifold is also claimed.

These and other features of the present invention can be best understood from the following specification and drawings, the following of which is a brief description.

DETAILED DESCRIPTION

Figure 1:
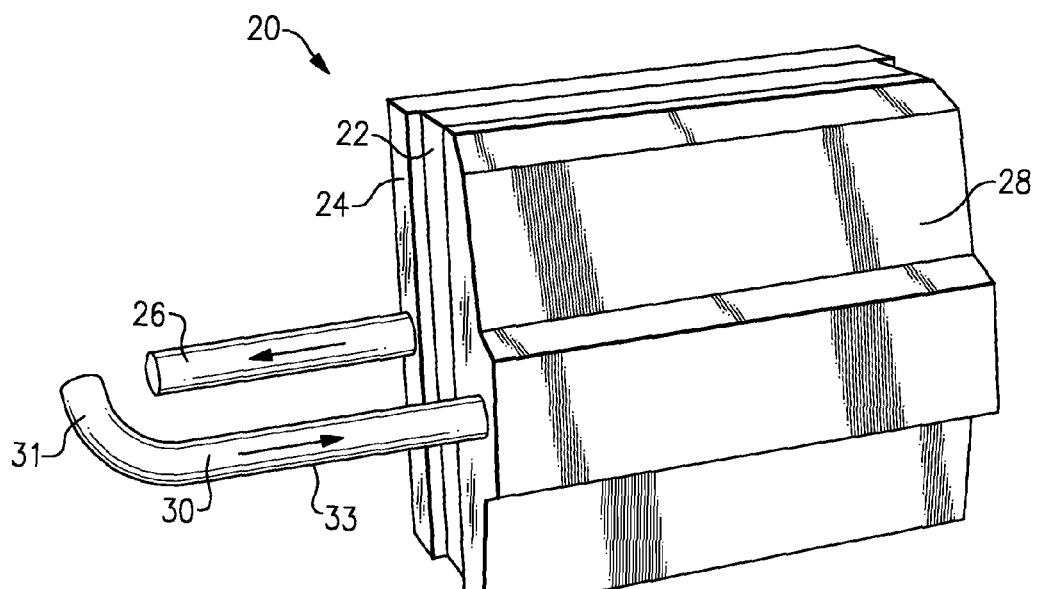
FIG. 1 is a perspective view of a fuel cell incorporating this invention.

A fuel cell 20 is illustrated in FIG. 1 and operates in a known manner. A cell stack 22 is sandwiched between an outlet manifold 24, which communicates with an outlet pipe 26, and inlet manifold 28, which communicates with an inlet pipe 30. As shown, inlet pipe 30 includes a first portion 31 communicating with a second portion 33, which then communicates into the manifold 28. The first portion 31 is positioned at approximately a 90 angle with regard to the second portion 33 such that the fuel bends before approaching the manifold 28. This bend is representative of but one of a multiplicity of combinations of possible bends or angles in the fuel inlet piping.

Figure 2A:
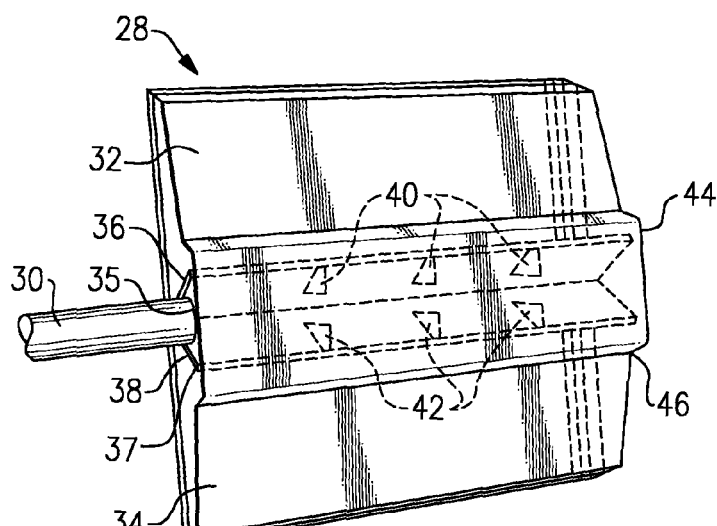
FIG. 2A is a cutaway view showing detail of an inlet manifold.
Figure 2B:
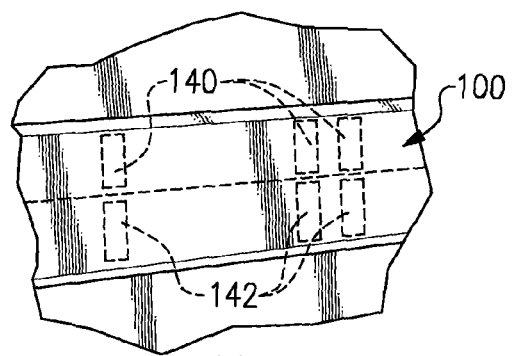
FIG. 2B shows an alternative embodiment.

As shown in FIG. 2A, within the manifold 28 are a pair of side chambers 32 and 34. A baffle 37 is formed by side plates 36 and 38, positioned on opposed sides of the port 35 where the inlet pipe 30 ends and communicates the fuel into the manifold 28. The plates 36 and 38 extend away from each other and form a v-shape. As shown, guide vanes 40 and 42 are positioned within the baffle 37, and evenly spaced along a length of the manifold 28. These positions are representative and other possible guide vane positions can be unequally spaced as shown in FIG. 2B, where manifold 100 has guide vanes 140 and 142. Also, there can be a greater or lesser number than guide vanes 40 and 42. The guide vanes further distribute the fuel evenly along the length of the manifold outer wall 44. As shown, an outer wall 44 has curved edges 46, which will guide flow of a fuel, as will be explained below. Baffle 37 extends for at least 75% of the length of the fuel cell 22. In the illustrated embodiment, it extends for the entire length. The size, shape, location and number of guide vanes can be selected dependent on the fuel flow rate and gas properties.

Figure 3:
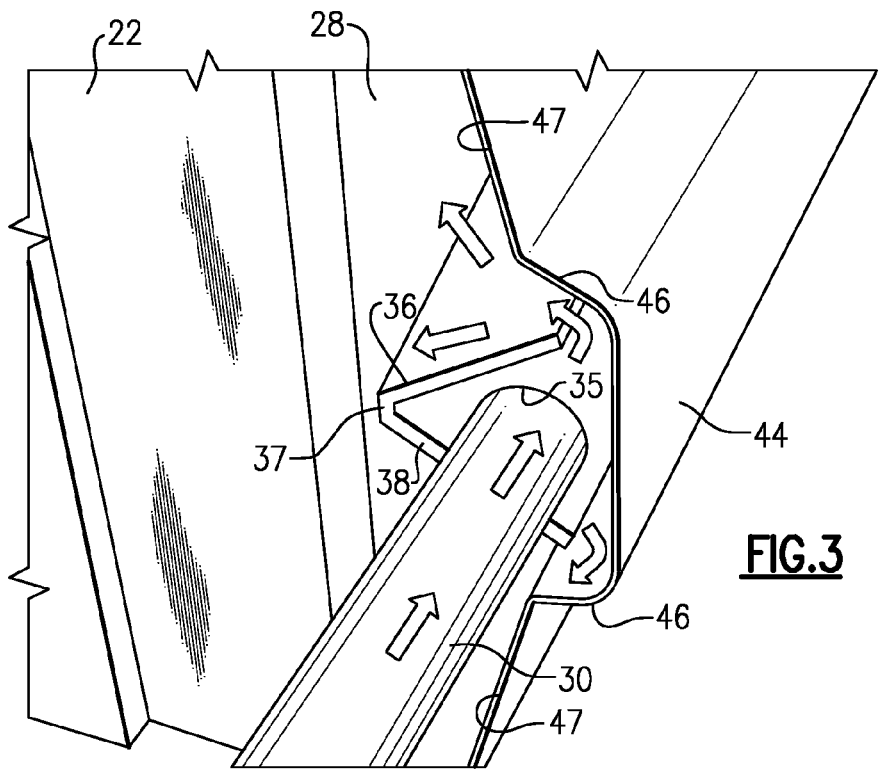
FIG. 3 is a cutaway view showing flow structure.

FIG. 3 removes the end wall of the manifold 28 to illustrate the interior structure. When the fuel exits the port 35 and moves into the manifold 28, it will flow outwardly through the gap between the outer walls 44 and 46 and the baffle side plates 36 and 38. The baffle plates 36 and 38 are spaced from the outer wall 44 such that the flow can bend back around the contoured surfaces 46 toward the cell stack 22. As shown, the outer wall 44 has side portions 47 that will further guide the fuel to the extreme ends of the cell stack 22. The outer surfaces of baffle walls 36 and 38 along with walls 47 form a diffuser that slows the fuel to the desired velocity. With this arrangement, the fuel is better distributed across the entire face of the cell stack 22. Moreover, the arrangement is relatively simple when compared to prior art structure.

Also the space between the baffle side plates 36 and 38 and the curved outer wall 46 is large to allow water droplets to fall downward and not collect or create puddles. This feature provides a benefit in cold weather operation. The space is sufficient such that when ice forms it is less likely to bridge the baffle and side wall gap. As such, entrained fluid will provide little concern with this arrangement.

The nominal size of a water droplet is 2.3 mm in diameter. The gap of the flow passages could be 5.0 mm or larger to prevent water droplet bridging. If so, ice will likely not form a barrier and block the fluid flow channels.

If the fuel cell inlet piping 30 is positioned vertically along with the baffle 37 and contoured side walls 44 and 46 then the functioning will remain as described previously.

Figure 4:
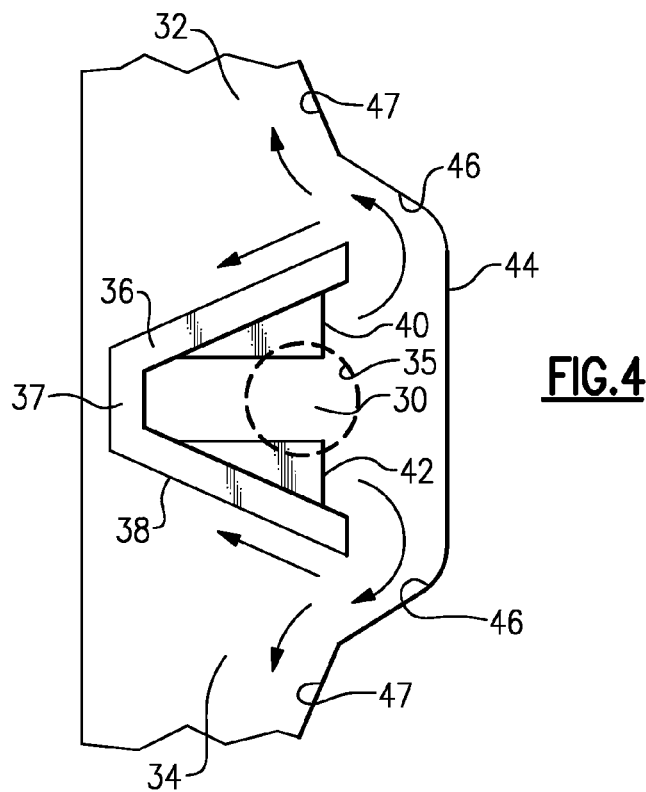
FIG. 4 is a cross-sectional view through a portion of the inlet manifold.

FIG. 4 shows the diameter of inlet pipe 30 relative to the spacing between guide vanes 40 and 42. This spacing is a feature that extracts a portion of the fuel as it advances along the length of the manifold. This spacing may vary for each pair of upper and lower guide vanes.

As can be appreciated, the baffle directs the fuel in a direction away from the cell stack and in opposed lateral directions relative to a flow direction leaving the inlet pipe.

As mentioned above, the inlet pipe 30 can be at any other position relative to the remainder of the fuel cell. Also, while a particular arrangement of inlet manifold, outlet manifold, and fuel cell stack is illustrated in FIG. 1, any other orientation could benefit from the inlet manifold of this invention.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An inlet manifold for a fuel cell including:
   an inlet manifold, said inlet manifold communicating with an inlet pipe, said inlet pipe entering said inlet manifold at a port; and
   a baffle positioned about said port and in said inlet manifold, said baffle including a pair of baffle plates extending away from each other, said baffle configured to direct a reactant at a manifold wall which is opposed from a cell stack, and in opposed lateral directions relative to a flow direction of the reactant entering said port, wherein guide vanes subdivide the flow along said baffle, and are at spaced positions on said baffle plates.

2. The inlet manifold as set forth in claim 1, wherein there are guide vanes on facing surfaces of both of said baffle plates.

3. The inlet manifold as set forth in claim 1, wherein said guide vanes are evenly spaced along a length of said baffle.

4. The inlet manifold as set forth in claim 1, wherein said guide vanes are unevenly spaced along a length of said baffle.

5. The inlet manifold as set forth in claim 1, wherein said baffle extends axially along said flow direction for at least 75% of a length of the manifold.

6. The inlet manifold as set forth in claim 1, wherein an outer wall of said inlet manifold is contoured about extreme edges of said baffle plates to guide the fuel both laterally outwardly and in a direction back toward where a cell stack will be.

7. The inlet manifold as set forth in claim 1, wherein said baffle is spaced from the manifold wall by a sufficient distance to allow gravity drain of water.

8. The inlet manifold as set forth in claim 1, wherein the size of the flow passages between the baffle, the port and the manifold wall are selected to be sufficiently large to prevent bridging of the passages by ice.

9. An inlet manifold for a fuel cell including:
   an inlet manifold communicating with an inlet pipe, said inlet pipe entering said inlet manifold at a port;
   a baffle positioned about said port and in said inlet manifold, said baffle configured to direct a reactant at a manifold wall which is opposed from a cell stack, and in opposed lateral directions relative to a flow direction of the reactant entering said port;
   said baffle including a pair of baffle plates extending away from each other, and guide vanes subdividing the flow along said baffle, said guide vanes being at spaced positions on both of said baffle plates;
   said baffle extending axially along said flow direction for at least 75% of a length of the manifold; and
   an outer wall of said inlet manifold contoured about extreme edges of said baffle plates to guide the fuel both laterally outwardly and in a direction back toward where a cell stack will be.

10. The inlet manifold as set forth in claim 9, wherein said guide vanes are evenly spaced along a length of said baffle.

11. The inlet manifold as set forth in claim 9, wherein said guide vanes are unevenly spaced along a length of said baffle.

12. The inlet manifold as set forth in claim 9, wherein said baffle is spaced from the manifold wall by a sufficient distance to allow gravity drain of water.

13. The inlet manifold as set forth in claim 9, wherein the size of the flow passages between the baffle, the port and the manifold wall are selected to be sufficiently large to prevent bridging of the passages by ice.

14. A fuel cell including:
   a cell stack; and
   an inlet manifold communicating with an inlet pipe, said inlet pipe entering said inlet manifold at a port, a baffle positioned about said port and in said inlet manifold, said baffle configured to direct a reactant at a manifold wall which is opposed from said cell stack, and in opposed lateral directions relative to a flow direction of the reactant entering said port, wherein said baffle extends axially along said direction of the fuel flow for at least 75% of a length of the manifold.

15. The fuel cell as set forth in claim 14, wherein said baffle includes a pair of baffle plates extending away from each other.

16. The fuel cell as set forth in claim 14, wherein guide vanes subdivide the flow along said baffle, and are at spaced positions on said baffle plates.

17. A fuel cell including:
   a cell stack; and
   an inlet manifold communicating with an inlet pipe, said inlet pipe entering said inlet manifold at a port, a baffle positioned about said port and in said inlet manifold, said baffle configured to direct a reactant at a manifold wall which is opposed from said cell stack, and in opposed lateral directions relative to a flow direction of the reactant entering said port, wherein an outer wall of said inlet manifold is contoured about extreme edges of said baffle plates to guide the fuel both laterally outwardly and back toward said cell stack.

* * * * *